Nov. 21, 1967     A. F. WEEDS     3,353,788

BLADED ROTOR FOR A FLUID FLOW MACHINE

Filed Dec. 5, 1966

*Inventor*
Alan Francis Weeds
By
Cushman, Darby & Cushman
*Attorneys*

United States Patent Office 3,353,788
Patented Nov. 21, 1967

3,353,788
BLADED ROTOR FOR A FLUID FLOW MACHINE
Alan Francis Weeds, Nelson, England, assignor to Rolls-Royce Limited, Derby, England, a British company
Filed Dec. 5, 1966, Ser. No. 599,262
Claims priority, application Great Britain, Dec. 29, 1965, 55,139/65
12 Claims. (Cl. 253—77)

ABSTRACT OF THE DISCLOSURE

A bladed rotor for a fluid flow machine having blades with roots located in axially extending slots in the rotor disc. Bladed locking means are mounted in the slots radially inwardly of the root and comprise two portions, one of which engages the root of a blade and the other of which engages the sides of the rotor disc adjacent the slot. The portions, which are either detachably engaged with each other or formed integrally with each other, prevent axial movement of the root in the slot and at least one of the portions is flexible in a circumferential direction to permit assembly of the root in the slot.

---

This invention concerns a bladed rotor for a fluid flow machine such for example as a gas turbine engine.

According to the present invention, there is provided a bladed rotor for a fluid flow machine having a plurality of angularly spaced apart axially extending peripheral slots of dovetail-shape in each of which there is mounted a correspondingly shaped root of a blade, and locking means mounted in each slot radially inwardly of the respective root, the locking means having portions which respectively engage the rotor and the root, the said portions engaging or being formed integrally with each other in such a way as to resist axial movement of the root in the slot, and at least one of the portions of each locking means being resilient to permit it to flex in a circumferential direction during the assembly of the respective locking means and root in the respective slot.

Each of the locking means may be fabricated from sheet metal.

One of the portions of each locking means may have end members which engage opposite sides of the rotor, another of the said portions having end members which engage opposite ends of the respective root.

Means may be provided for preventing relative radial movement of the portions of each locking means in the respective slot. Thus, each locking means or separate part of each locking means may have at least one member which engages the adjacent side wall of the slot to prevent radial movement thereof in the slot.

In one form of the present invention, each locking means comprises two separate portions one of two portions having a projection which is received within a recess in the other portion. In this form of the invention the said other portion may have at least one sloping surface leading to the outer part of the recess, the projection having been forced over the or a said surface during the said assembly.

In another form of the present invention, the locking means comprises two portions integrally joined together at one end of the locking means. In this form of the invention, the two portions of each locking means may be resiliently urged towards positions in which they lock the respective root in the respective slot, the said two portions being movable towards each other to permit the introduction of the locking means into the respective slot.

The invention also comprises a fluid flow machine such, for example, as a gas turbine engine, provided with at least one bladed rotor as set forth above.

Figure 1:
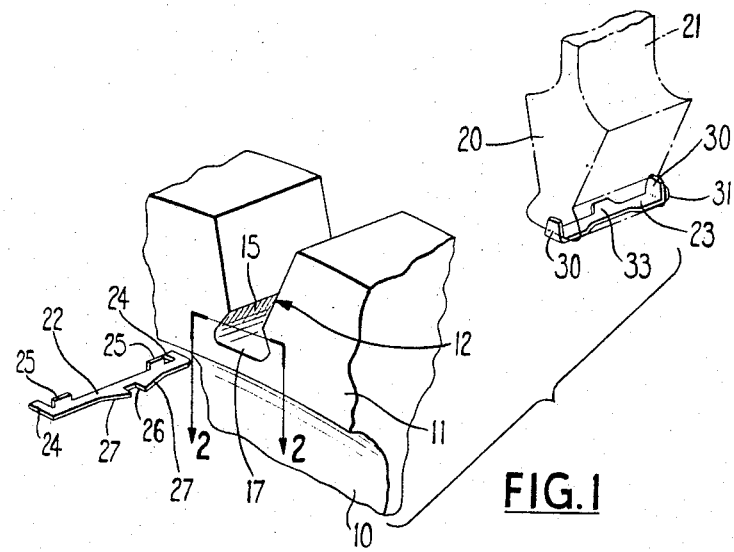
Figure 2:
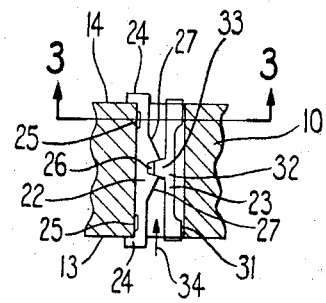
Figure 3:
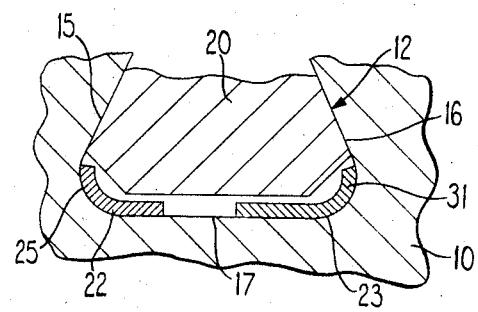
Figure 4:
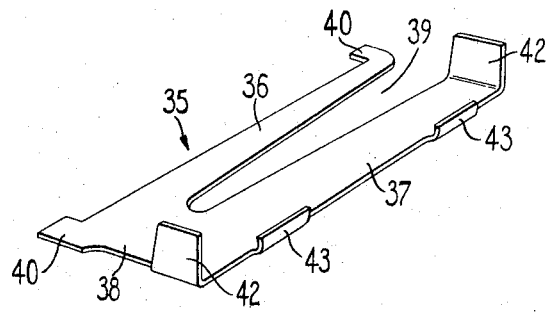

The invention is illustrated, merely by way of example, in the accompanying drawings, in which:

FIGURE 1 is an exploded perspective view of part of a bladed rotor according to the present invention, FIGURE 2 is a broken-away sectional view taken on the line 2—2 of FIGURE 1, FIGURE 3 is a broken-away sectional view taken on the line 3—3 of FIGURE 2, and FIGURE 4 is a perspective view of a modification.

Referring first to FIGURES 1 to 3 of the drawings, a compressor or turbine rotor 10 of a gas turbine engine (not shown) has a thickened peripheral region 11 which is formed with a plurality of angularly spaced apart slots 12.

Each of the slots 12 extends axially between opposite sides 13, 14 of the peripheral region 11. Each of the slots 12 is, moreover, of dovetail shape and has axially extending side walls 15, 16 adjacent to its base 17.

Mounted in each of the slots 12 is a dovetailed shape root 20 of an aerofoil-shaped blade 21.

Each of the roots 20 is locked in its slot 12, so as to be prevented from moving axially therein, by means of a sheet metal (e.g. spring steel) locking member formed of two separate portions 22, 23. Each of the two-portion locking members 22, 23 is respectively mounted in its slot 12 radially inwardly of the respective root 20. This is clearly shown in FIGURE 3.

Each of the portions 22 is provided with end tabs 24 at its opposite ends, the end tabs 24 respectively engaging the opposite sides 13, 14 of the rotor 10. Each of the portions 22, moreover, is provided adjacent its end tabs 24 with upstanding tabs 25 which engage the side wall 15 of the respective slot 12 so as to prevent radial movement of the part 22 in the respective slot 12.

Each of the portions 22 is also provided, centrally of its length, with a recess 26 and with sloping surfaces 27 which respectively lead to the outer part of the recess 26.

Each of the portions 23 is provided at its opposite ends with end tabs 30 which respectively engage opposite ends of the respective root 20. Each of the portions 23 is also provided, adjacent its end tabs 30, with upstanding tabs 31 (best seen in FIGURE 3). The upstanding tabs 31 engage the adjacent side wall 16 of the respective slot 12 to prevent radial movement of the portion 23 in the respective slot 12.

Each of the portions 23 has a central member 32 of less width than the end member thereof, so as to permit flexing of this central member 32. The central member 32 is provided with a projection 33 which is adapted to be received within the recess 26 in the respective portion 22.

Each of the blades 21 may be assembled in its slot 12 by first fixing the portion 22 in the slot 12 and in engagement with the base 17 thereof, the end tabs 24 engaging the opposite sides 13, 14 of the rotor 10 and the upstanding tabs 25 engaging the side wall 15 of the slot 12. The portion 23 is then secured in position beneath the root 20 of the blade 21, as indicated in FIGURE 1, with the end tabs 30 engaging the opposite ends of the root 20.

The root 20, with the portion 23 secured beneath it, is then forced into the slot 12 from one side or other of the rotor 10. This causes the projection 33 to be forced over one or other of the sloping surfaces 27, such movement being possible by reason of the flexure of the central member 32 of the portion 23. Finally, the projection 33 will enter the recess 26 so as to be locked therein, while the upstanding tabs 25, 31 will prevent relative radial movement of the portions 22, 23, so as to stop them from springing apart from each other.

Thus axial movement of the root 20 of each blade in its slot 12 is resisted by an easily fabricated two portion locking member 22, 23, the portions of which respectively engage the rotor 10 and the root 20 and the portions of which do not employ tabs which require to be bent or peened into position in order to effect a locking.

If it is desired to remove a blade 21 from the rotor 10, this may be effected by inserting a wedge (not shown) into the gap between the portions 22, 23 and in the direction of arrow 34 of FIGURE 2.

FIGURE 4 illustrates a modification of the present invention in which each of the roots 20 is locked axially in its slot 12 by means of a forked one-piece sheet metal (e.g. spring steel) locking member 35 having portions 36, 37 which are integrally joined together at one end 38 of the locking member 35, and which have a gap 39 between them which extends to the opposite end of the locking member 35.

The portion 36 has end tabs 40 which, like the end tabs 24, engage opposite sides 13, 14 of the rotor 10.

The portion 37 has end tabs 42 for engagement with opposite ends of the root 20 of the respective blade. The portion 37 is also provided with upstanding tabs 43 which, like the tabs 31, are adapted to engage the side wall 16 of the respective slot 12 so as to resist radial movement of the portion 37 in the slot 12.

The portions 36, 37 are thus urged by the inherent resilience of the locking member 35 into the relative positions shown in FIGURE 4 in which they lock the respective root 20 in the respective slot 12. However, by reducing the width of the gap 39 by moving the respective end tab 40 towards the adjacent end tab 42, it is possible to remove the root 20 from the slot 12.

Additional tabs (not shown) may be provided adjacent to the tabs 24, 40 so as to increase the area of contact between the portions 22, 36 respectively and the rotor 10 whereby to diminish the risk of frettage therebetween.

I claim:
1. A bladed rotor for a fluid flow machine comprising: a rotor disc having a plurality of annularly spaced apart axially extending peripheral slots of dovetail shape; a plurality of blades having roots corresponding in shape to said dovetail shape of said slots, each slot having mounted therein the root of one of said blades; and locking means mounted in each slot radially inwardly of the respective root therein, said locking means having portions respectively engaging the rotor disc adjacent the slot and the respective root therein, said portions also engaging each other to resist axial movement of the respective root in the slot, and at least one of said portions of each locking means being flexible in a circumferential direction to accommodate the respective locking means and root in the respective slot, each locking means having a greater width circumferentially than that of the respective slot when the locking means is unflexed.

2. A bladed rotor for a fluid flow machine comprising: a rotor disc having a plurality of annularly spaced apart axially extending peripheral slots of dovetail shape; a plurality of blades having roots corresponding in shape to said dovetail shape of said slots, each slot having mounted therein the root of one of said blades; and locking means mounted in each slot radially inwardly of the respective root therein, said locking means having portions respectively engaging the rotor disc adjacent the slot and the respective root therein, said portions being formed integrally with each other to resist axial movement of the respective root in the slot, and at least one of said portions of each locking means being flexible in a circumferential direction to accommodate the respective locking means and root in the respective slot, each locking means having a greater width circumferentially than that of the respective slot when the locking means is unflexed.

3. A bladed rotor as claimed in claim 1 in which each of the locking means is fabricated from sheet metal.

4. A bladed rotor as claimed in claim 1 in which one of the portions of each locking means has end members which engage opposite sides of the rotor, another of the said portions having end members which engage opposite ends of the respective root.

5. A bladed rotor as claimed in claim 1 comprising means for preventing relative radial movement of the portions of each locking means in the respective slot.

6. A bladed rotor as claimed in claim 5 in which each locking means has at least one member which engages the adjacent side wall of the slot to prevent radial movement thereof in the slot.

7. A bladed rotor as claimed in claim 2 comprising means for preventing relative radial movement of the portions of each locking means in the respective slot, each separate portion of each locking means having at least one member which engages the adjacent side wall of the slot to prevent radial movement thereof in the slot.

8. A bladed rotor as claimed in claim 1 in which each locking means comprises two separate portions, one of the two portions having a projection and the other of the two portions having a recess in which the projection is received.

9. A bladed rotor as claimed in claim 8 in which said other portion has at least one sloping surface leading to the outer part of the recess, the projection having been forced over the or a said surface during the said assembly.

10. A bladed rotor as claimed in claim 2 in which each locking means comprising two portions integrally joined together at one end of the locking means.

11. A bladed rotor as claimed in claim 10 in which the two portions of each locking means are formed such that they are resiliently urged towards positions in which they lock the respective root in the respective slot, the said two portions also being formed such that they are movable towards each other to permit the introduction of the locking means into the respective slot.

12. A fluid flow machine provided with at least one bladed rotor as claimed in claim 1.

References Cited

UNITED STATES PATENTS

| | | | |
|---|---|---|---|
| 2,786,648 | 3/1957 | Ledwith | 253—77 |
| 2,828,942 | 4/1958 | McCullough et al. | 253—77 |
| 2,847,187 | 8/1958 | Murphy | 253—77 |
| 2,928,651 | 3/1960 | Turnbull | 253—77 |
| 2,994,507 | 8/1961 | Keller et al. | 253—77 |

EVERETTE A. POWELL, Jr., *Primary Examiner.*